(12) United States Patent
Erlacher et al.

(10) Patent No.: US 9,702,391 B2
(45) Date of Patent: Jul. 11, 2017

(54) ADHESIVE JOINT AND ADHESION PROCESS

(71) Applicant: MAGNA STEYR Engineering AG & Co KG, Graz (AT)

(72) Inventors: Manuel Erlacher, Radenthein (AT); Martin Rodler, Krottendorf (AT); Harald Zachnegger, Graz (AT)

(73) Assignee: MAGNA STEYR Engineering AG & Co KG, Graz (AT)

(*) Notice: Subject to any disclaimer, the term of this patent is extended or adjusted under 35 U.S.C. 154(b) by 204 days.

(21) Appl. No.: 14/606,276

(22) Filed: Jan. 27, 2015

(65) Prior Publication Data

US 2016/0017909 A1    Jan. 21, 2016

(30) Foreign Application Priority Data

Jan. 27, 2014  (EP) ..................................... 14152705

(51) Int. Cl.

| F16B 13/14 | (2006.01) |
|---|---|
| B62D 23/00 | (2006.01) |
| B62D 27/02 | (2006.01) |
| B62D 29/00 | (2006.01) |
| F16B 11/00 | (2006.01) |
| C09J 5/08 | (2006.01) |

(52) U.S. Cl.
CPC .......... *F16B 13/141* (2013.01); *B62D 23/005* (2013.01); *B62D 27/026* (2013.01); *B62D 29/002* (2013.01); *C09J 5/08* (2013.01); *F16B 11/008* (2013.01)

(58) Field of Classification Search
CPC .. B62D 23/005; B62D 27/026; B62D 29/002; B62D 27/023; B62D 29/008; C09J 5/08; F16B 11/008; F16B 11/006; F16B 13/141; Y10T 403/472; Y10T 403/473; Y10T 403/4694; Y10T 403/475; Y10T 403/4924
USPC .................. 403/267, 268, 277; 156/293, 294
See application file for complete search history.

(56) References Cited

U.S. PATENT DOCUMENTS

| 2,580,118 A | * | 12/1951 | Mercier | ................. | B62K 19/24 |
|---|---|---|---|---|---|
| | | | | | 403/384 |
| 4,190,479 A | * | 2/1980 | Smith | ......................... | C09J 5/00 |
| | | | | | 156/294 |
| 4,256,333 A | * | 3/1981 | Jones | ......................... | A61J 1/05 |
| | | | | | 285/22 |
| 4,352,584 A | * | 10/1982 | Smith | ......................... | C09J 5/00 |
| | | | | | 403/13 |

(Continued)

FOREIGN PATENT DOCUMENTS

| AT | EP 0450358 A1 | * | 10/1991 | ............. | B62K 19/22 |
|---|---|---|---|---|---|
| AT | WO 2006099648 A2 | * | 9/2006 | ............. | B62D 25/04 |

(Continued)

*Primary Examiner* — James Ference
(74) *Attorney, Agent, or Firm* — Jordan IP Law, LLC; Todd A. Vaughn (57) ABSTRACT

An adhesive joint of a first hollow profile to a second hollow profile, and a method of producing such an adhesive joint. The second hollow profile is surrounded in an overlapping region by the first hollow profile, and a core connected to the first hollow profile is arranged in the overlapping region inside the first hollow profile and the second hollow profile. An expandable structural adhesive is arranged between the core and the inner face of the second hollow profile.

18 Claims, 5 Drawing Sheets

(56) References Cited

U.S. PATENT DOCUMENTS

| | | | | |
|---|---|---|---|---|
| 4,355,919 | A * | 10/1982 | Lievonen | F16B 7/0446 403/178 |
| 4,388,013 | A * | 6/1983 | Bergheim | B21D 39/04 285/382.4 |
| 4,721,407 | A * | 1/1988 | Liu | B62K 19/22 403/198 |
| 5,052,848 | A * | 10/1991 | Nakamura | B62K 19/22 280/281.1 |
| 5,102,188 | A * | 4/1992 | Yamane | B29C 44/188 296/187.02 |
| 5,213,391 | A * | 5/1993 | Takagi | B29C 44/1228 29/451 |
| 5,228,259 | A * | 7/1993 | Haddad | B62D 23/005 403/170 |
| 5,320,403 | A * | 6/1994 | Kazyak | B62D 23/005 296/203.01 |
| 5,575,526 | A * | 11/1996 | Wycech | B29C 44/1228 180/68.4 |
| 5,658,086 | A * | 8/1997 | Brokaw | A47B 13/003 144/354 |
| 5,678,826 | A * | 10/1997 | Miller | B29C 44/188 264/275 |
| 5,716,155 | A * | 2/1998 | Yoshida | B62D 23/005 403/187 |
| 5,725,272 | A * | 3/1998 | Jones | B60R 13/07 277/650 |
| 5,884,960 | A * | 3/1999 | Wycech | B29C 44/1228 296/146.6 |
| 5,887,909 | A * | 3/1999 | Tokuda | F16L 13/116 285/148.18 |
| 6,068,424 | A * | 5/2000 | Wycech | B62D 25/04 156/293 |
| 6,168,226 | B1 * | 1/2001 | Wycech | B29C 44/1228 180/68.4 |
| 6,406,078 | B1 * | 6/2002 | Wycech | E05B 17/2003 292/346 |
| 6,523,857 | B1 * | 2/2003 | Hopton | F16B 7/0406 280/756 |
| 6,543,788 | B2 * | 4/2003 | Ito | B26B 19/38 277/630 |
| 6,668,457 | B1 * | 12/2003 | Czaplicki | B62D 29/002 29/402.09 |
| 6,953,219 | B2 * | 10/2005 | Lutz | B62D 29/002 296/187.02 |
| 7,036,203 | B2 * | 5/2006 | Rudduck | B62D 23/005 29/281.1 |
| 7,318,873 | B2 * | 1/2008 | Czaplicki | B29C 70/70 156/293 |
| 7,448,820 | B1 * | 11/2008 | Faber | F16B 7/0453 256/65.08 |
| 7,560,003 | B2 * | 7/2009 | Naughton | B29C 66/301 156/292 |
| 2002/0074827 | A1 * | 6/2002 | Fitzgerald | B62D 29/002 296/187.02 |
| 2002/0160130 | A1 * | 10/2002 | Sheldon | B62D 21/15 428/34.1 |
| 2002/0174954 | A1 * | 11/2002 | Busseuil | B62D 25/00 156/349 |
| 2003/0194548 | A1 * | 10/2003 | McLeod | B29C 44/18 428/304.4 |
| 2003/0196753 | A1 * | 10/2003 | Schoenfeld | C08G 18/672 156/330 |
| 2008/0029200 | A1 * | 2/2008 | Sheasley | B60R 13/06 156/79 |
| 2009/0108626 | A1 * | 4/2009 | Richardson | B62D 29/002 296/187.02 |
| 2011/0094656 | A1 * | 4/2011 | Ferrari | C09J 5/10 156/158 |
| 2011/0220267 | A1 * | 9/2011 | Blancaneaux | C08L 63/00 156/78 |
| 2012/0091755 | A1 * | 4/2012 | Endrich | B62D 29/002 296/187.01 |
| 2012/0235401 | A1 * | 9/2012 | Richardson | B62D 27/023 285/285.1 |
| 2014/0301775 | A1 * | 10/2014 | Ehrlich | B62D 27/02 403/267 |
| 2016/0017909 | A1 * | 1/2016 | Erlacher | C09J 5/08 403/265 |

FOREIGN PATENT DOCUMENTS

| | | |
|---|---|---|
| AT | 008606 U1 | 10/2006 |
| CN | 102232100 A | 11/2011 |
| DE | 102010044116 A1 | 4/2011 |
| EP | 0450358 A1 | 10/1991 |
| FR | 2569817 A1 | 3/1986 |
| WO | 02/02387 A2 | 1/2002 |
| WO | 2006/099648 A2 | 9/2006 |

* cited by examiner

ADHESIVE JOINT AND ADHESION PROCESS

CROSS-REFERENCE TO RELATED APPLICATIONS

The present application claims priority 35 U.S.C. §119 to European Patent Publication No. EP 14152705.1 (filed on Jan. 27, 2014), which may be hereby incorporated by reference in its entirety.

TECHNICAL FIELD

Embodiments relate to an adhesive joint of a first hollow profile to a second hollow profile, in which the second hollow profile is surrounded in an overlapping region by the first hollow profile, and a bonding method for producing such an adhesive joint.

BACKGROUND

Connections between two hollow profiles are required in very different fields of the prior art, for example, to form load-bearing frame structures, and also in the so-called "space frame" construction of vehicle bodies in motor vehicle manufacturing.

For connecting two hollow profiles, it is known to insert one of the hollow profiles into the other and to weld, clip or bond, for example, the two hollow profiles in the overlapping region. Simple bonded connections are, however, only secure to a certain degree, in particular in the case of inaccurate fit or warpage of the hollow profiles.

For example, a bodywork module for a motor vehicle with a plurality of support profiles connected together is disclosed in DE 10 2006 044 799 A1. In such a bodywork module, the supporting ends thereof have to be inserted into receiver openings of further support profiles adjacent to the bodywork module. The supporting ends are assigned to separate locking bar elements which are displaceably retained on the associated support profile. By displacement relative to the associated support profile, the supporting ends have to be inserted into the respective receiver opening of the corresponding further support profile adjacent to the bodywork module. A bonded connection may be implemented between the locking bar element and the associated receiver opening.

SUMMARY

In accordance with embodiments, provided is an adhesive joint (and a corresponding bonding method) of a first hollow profile to a second hollow profile which may be produced in a simple and cost-effective manner and yet is reliable.

In accordance with embodiments, an adhesive joint of a first hollow profile to a second hollow profile, wherein the second hollow profile is surrounded in an overlapping region by the first hollow profile, a core connected to the first hollow profile is arranged in the overlapping region inside the first hollow profile and the second hollow profile, and an expanding structural adhesive is arranged between the core and the inner face of the second hollow profile.

In accordance with embodiments, therefore, an auxiliary component, namely the core, is arranged inside the two hollow profiles inserted into one another, so that between the core and the inner second hollow profile a spacing is present which is filled up by an expanded structural adhesive. In the connection produced between the components, the structural adhesive is in an expanded state. The structural adhesive, therefore, produces an adhesive joint at least between the core and the inner hollow profile. By the expansion of the structural adhesive this connection is both a material connection and a non-positive connection and therefore particularly reliable. The core is also connected in a suitable manner to the outer hollow profile, so that ultimately the inner hollow profile is also connected to the outer hollow profile.

Developments of the invention are set forth in the dependent claims, the description and the accompanying drawings.

In accordance with embodiments, the second hollow profile has bores in the overlapping region such that if the expanding structural adhesive swells up through these bores, may pass therethrough the bores of the second hollow profile. As a result, an enhanced retention between the core and second hollow profile is achieved in the vertical direction, i.e. in the longitudinal direction of the hollow profile.

In accordance with embodiments, the structural adhesive passes sufficiently far through the bores that the expanding structural adhesive comes into contact with the inner face of the first hollow profile, and thus, is adhesively bonded thereto.

In accordance with embodiments, the structural adhesive should exert a pressure onto the inner face of the first hollow profile so that said inner face is also connected non-positively via the structural adhesive to the core and the second hollow profile.

In accordance with embodiments, the core has a base body with a diameter that corresponds to the internal diameter of the first hollow profile. The base body in this case may have the same shape as the first hollow profile, and thus, is insertable into the first hollow profile.

In accordance with embodiments, the base body may, in particular, have a through-hole for the vertical drainage of liquids.

In accordance with embodiments, an expanding foam may be arranged on the base body of the core, said expanding foam to extend over the entire surface of the base body. The expanding foam in this case may, in particular, also seal the through-hole in the base body and, for example, penetrate the through-hole, so that it is arranged on both sides of the base body. The expanding foam may, in particular, be a material which is expanded to an even greater degree than the expanding structural adhesive and serves, in particular, for vertical sealing in the region of the connection of the two hollow profiles in order to ensure a fluid-tight seal and/or improved acoustic damping. The expanding foam may extend laterally thereto as far as the inner face of the first hollow profile.

In accordance with embodiments, the base body has spacer lugs in order to ensure a predetermined vertical spacing between the second hollow profile and the base body, i.e., a spacing perpendicular to the surface of the base body. As a result, the hollow profiles may be positioned more accurately relative to one another and a larger surface for bonding is provided to the structural adhesive as in the regions without spacer lugs it is able to penetrate through the space between the core and second hollow profile.

In accordance with embodiments, the core has a neck with a diameter that is less than the internal diameter of the second hollow profile. The shape or cross-section of the neck corresponds to the shape or cross-section of the second hollow profile, so that a channel is formed between the neck and the second hollow profile. The channel forms the primary receiver space for the expanding structural adhesive.

In accordance with embodiments, the neck may extend parallel to the inner faces of the second hollow profile or, in particular in the case of increasing distance from the base surface of the core, taper in a conical manner.

In accordance with embodiments, the first hollow profile and the second hollow profile and the neck of the core have the same cross-sectional profile, in particular a round, rectangular or square profile.

In accordance with embodiments, a bonding method for producing an adhesive joint between a first hollow profile and a second hollow profile includes surrounding the second hollow profile in an overlapping region thereof by the first hollow profile; applying an expanding structural adhesive to an outer surface/face of a core; then at least temporarily fastening the core in the first hollow profile; then arranging the second hollow profile in a free channel between the core and the first hollow profile, and then expanding the structural adhesive so that the core and the second hollow profile are connected together by a material and non-positive connection.

In accordance with embodiments, the at least temporary fastening of the core in the first hollow profile takes place by a core of matching geometry being inserted into the first hollow profile. As a result, the core is already prepared by applying the structural adhesive before being inserted into the hollow profile.

In accordance with embodiments, the expanding structural adhesive is expanded via a thermal process, or a chemical reaction after introducing the core into the first hollow profile and inserting the second hollow profile.

In accordance with embodiments, in this case the second hollow profile has bores in the overlapping region and the expanding structural adhesive swells up through the bores during expansion, in particular, so that the expanding structural adhesive comes into contact with the inner face of the first hollow profile and preferably presses against said inner face.

In accordance with embodiments, cathodic dip coating is carried out after arranging the core in the first hollow profile and before the expansion of the expanding structural adhesive. The dip coating may, in particular, be carried out after arranging the second hollow profile between the core and the first hollow profile, and in a further embodiment even before arranging the second hollow profile.

In accordance with embodiments, the core may have a base body with a diameter that corresponds to the internal diameter of the first hollow profile. An expanding foam may be applied to this base body, said foam being expanded after arranging the core in the first hollow profile. The expanding foam may initially leave free a through-hole which may be present in the base body so that, for example, during dip coating, liquids may drain through the through-hole and the expanding foam. After the expansion of the expanding foam, the through-hole may be sealed by the expanding foam.

DRAWINGS

Embodiments will be illustrated by way of example in the drawings and explained in the description below.

DESCRIPTION

Figure 1A:
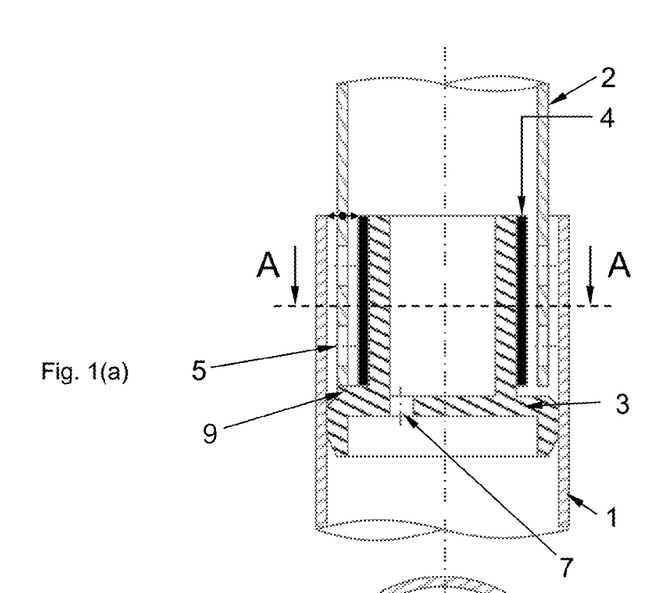
FIGS. 1(a) and 1(b) illustrate a side, sectional view of an adhesive joint and a top view corresponding to the section A-A before expansion of the structural adhesive.
Figure 1B:
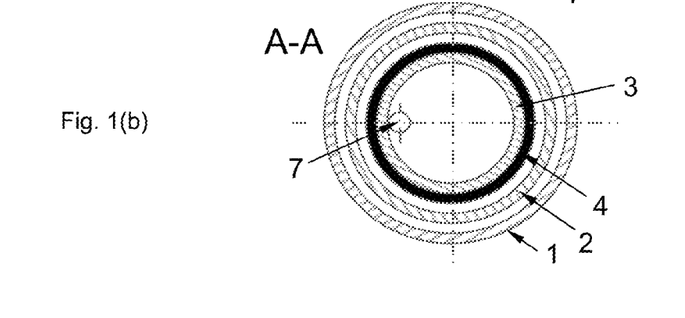
Figure 2A:
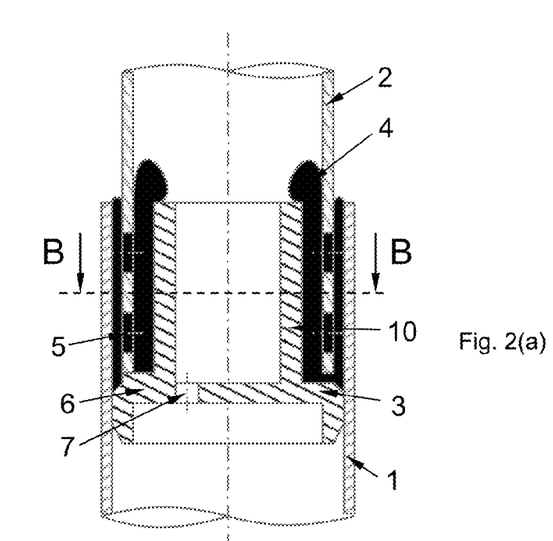
FIGS. 2(a) and 2(b) illustrate a side, sectional view of an adhesive joint and top view corresponding to the section A-A after expansion of the structural adhesive.
Figure 2B:
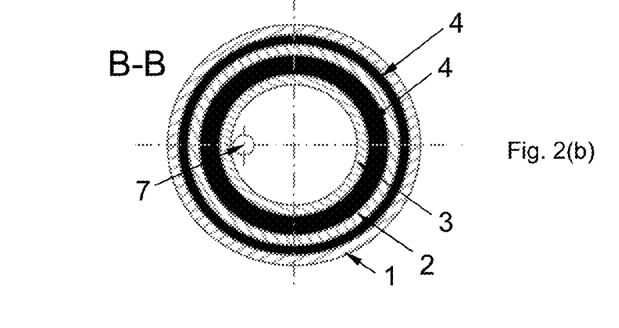

In FIGS. 1 and 2, an adhesive joint in accordance with embodiments of a first round hollow profile 1 to a second round hollow profile 2. The second hollow profile 2 is surrounded in an overlapping region by the first hollow profile 1, before the expansion of the structural adhesive 4 (FIG. 1) and after the expansion thereof (FIG. 2). In the overlapping region, inside the first hollow profile 1 and the second hollow profile 2, a core 3 is inserted into the first hollow profile 1. The structural adhesive 4, now in an expanding state, is arranged between the core 3 and the inner surface or face of the second hollow profile 2, the expanding structural adhesive 4 having been applied to the outer surface or face of the core 3.

As illustrated in FIGS. 2(a) and 2(b), the second hollow profile 2 has a plurality of bores 5 in the overlapping region so that the structural adhesive 4 in the expanded state swells up through the bores 5 so as to press against the inner face of the first hollow profile 1. Thus, the structural adhesive 4 is located both in an intermediate space between the outer hollow profile 1 and the inner hollow profile 2, and between the inner hollow profile 2 and the core 3, as well as in the bores 5 connecting the spaces.

The core 3 has a base body 6 with a shape or cross-section that corresponds to the shape or cross-section of of the first hollow profile 1. The base body 6 also has a diameter that corresponds to the internal diameter of the first hollow profile 1. Thus, the base body 6 substantially forms a flat disk and serves to secure the core 3 in the outer hollow profile 1. The base body 6 has a through-hole 7 which, in particular, serves to permit draining of liquids from the component. Thus, liquids which have been introduced by cathodic dip coating, for example, may be drained before, during and after producing the adhesive joint.

The core 3 additionally has a neck 10 that extends from the base body 6. The neck 10 has a diameter that is less than the internal diameter of the second hollow profile 2. The neck 10 extends parallel to the inner faces of the second hollow profile 2. The first hollow profile 1, the second hollow profile 2 and the core 3 and/or the neck 10 of the core 3, therefore, form concentric circles spaced apart from one another, in which in each case intermediate spaces are filled up between the circles by expanding structural adhesive 4 (FIG. 2(b)).

The base body 6 of the core 3 has spacer lugs 9 in order to ensure a predetermined vertical spacing between the second hollow profile 2 and the base body 6 which may also be filled up with structural adhesive 4. The position of the spacer lugs is particularly clearly visible in FIG. 11.

Figure 3:
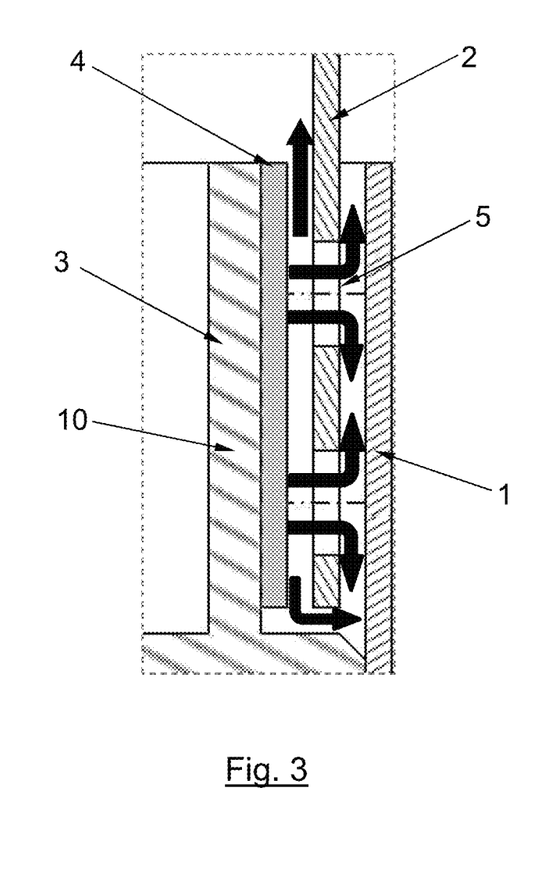
FIG. 3 illustrates a detailed view of the adhesive joint of FIG. 1(a) at the region around the bores, in accordance with embodiments.
Figure 4:
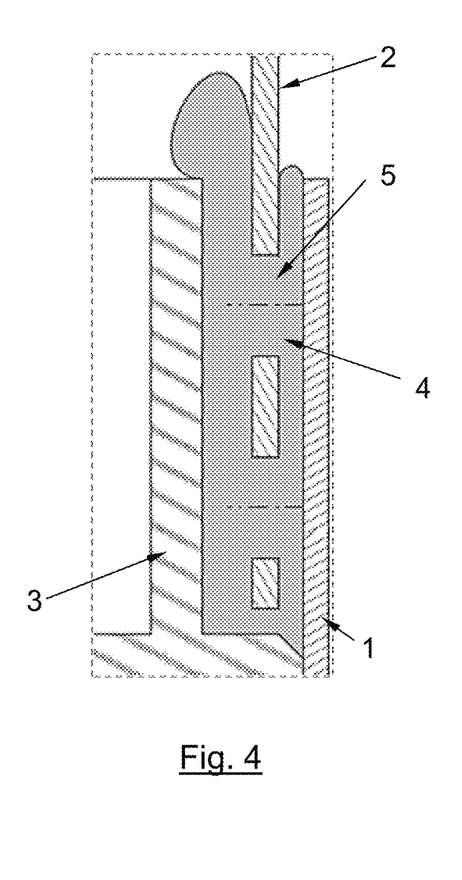
FIG. 4 illustrates a detailed view of the adhesive joint of FIG. 2(a) at the region around the bores, in accordance with embodiments.

As illustrated by arrows in FIG. 3, the expanding structural adhesive 4 enters through the bores 5 into the intermediate space between the second hollow profile 2 and the first hollow profile 1, and fills up said intermediate space (FIG. 4).

Figure 5A:
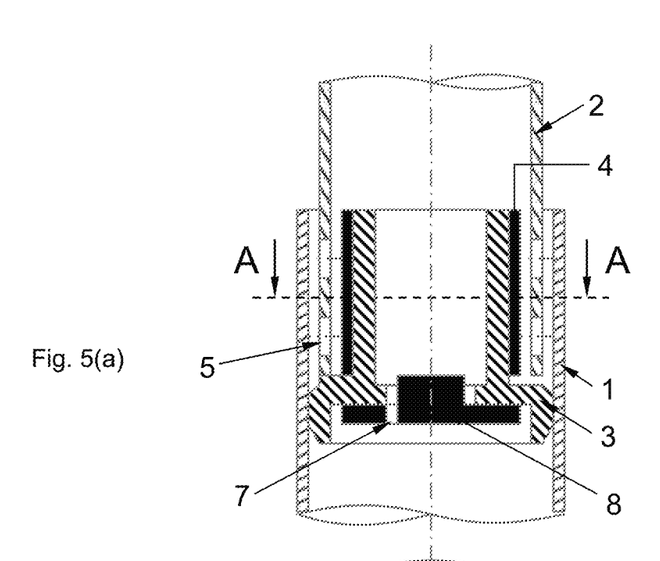
FIGS. 5(a) and 5(b) illustrate a side, sectional view of an adhesive joint and a top view corresponding to the section A-A, with an expanding foam before the expansion of the structural adhesive and the expanding foam, in accordance with embodiments.
Figure 5B:
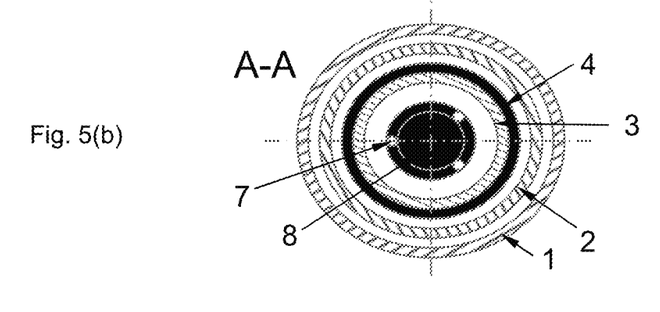
Figure 6A:
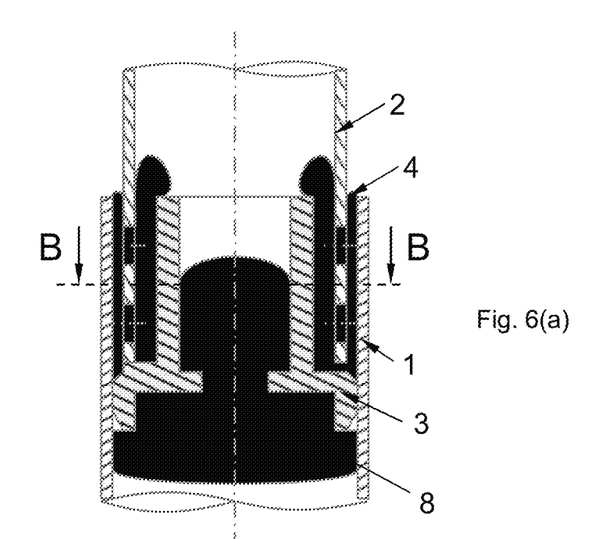
FIGS. 6(a) and 6(b) illustrate a side, sectional view of an adhesive joint and a top view corresponding to the section A-A, with an expanding foam after the expansion of the structural adhesive and the expanding foam, in accordance with embodiments.
Figure 6B:
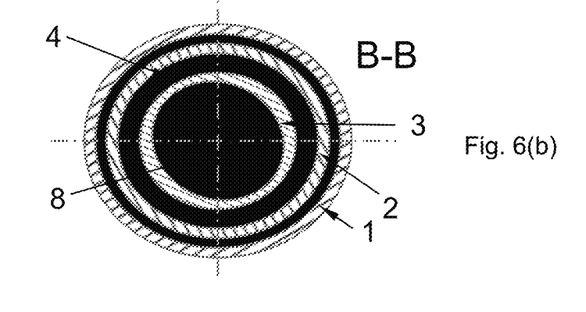

As illustrated in FIGS. 5 and 6, an expanding foam 8 is arranged on the base body 6 of the core 3. The expanding foam 8, which has been originally applied to the lower face of the base body 6, passes during the expansion thereof, through a central opening of the base body 6 and extends onto the upper face of the base body 6. The expanding foam 8 is located both on the core 3 and on the inner face of the first hollow profile 1. The expanding foam 8 in the expanded state also seals the through-hole in the base body 6.

Figure 7A:
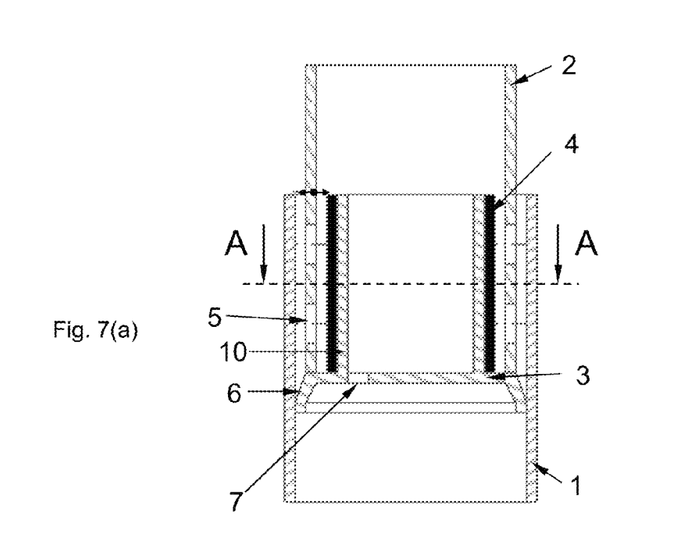
FIGS. 7(a) and 7(b) illustrate a side, sectional view of an adhesive joint (with rectangular profiles) and a top view corresponding to the section A-A before expansion of the structural adhesive, in accordance with embodiments.
Figure 7B:
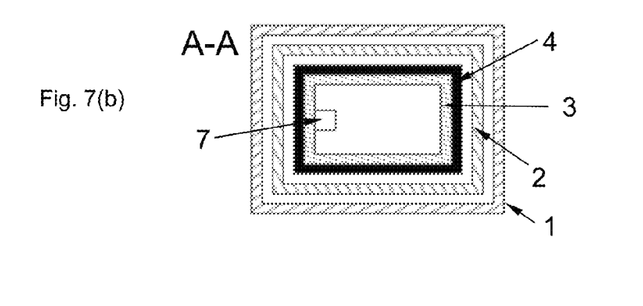
Figure 8A:
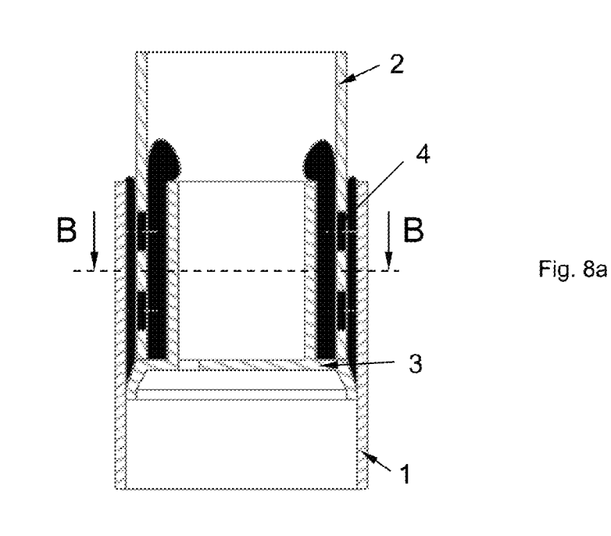
FIGS. 8(a) and 8(b) illustrate a side, sectional view of an adhesive joint (with rectangular profiles) and a top view corresponding to the section A-A after expansion of the structural adhesive, in accordance with embodiments.
Figure 8B:
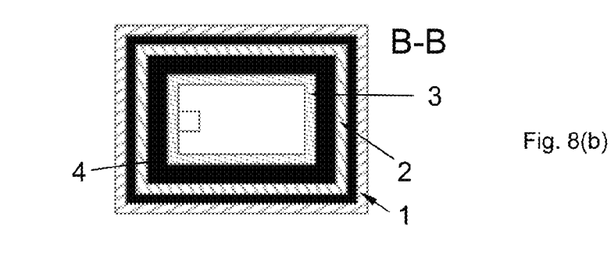

FIGS. 7 and 8 illustrate an embodiment with rectangular profiles for the first hollow profile 1, the second hollow profile 2, and the neck 10 of the core 3.

Figures 9A, 9B:
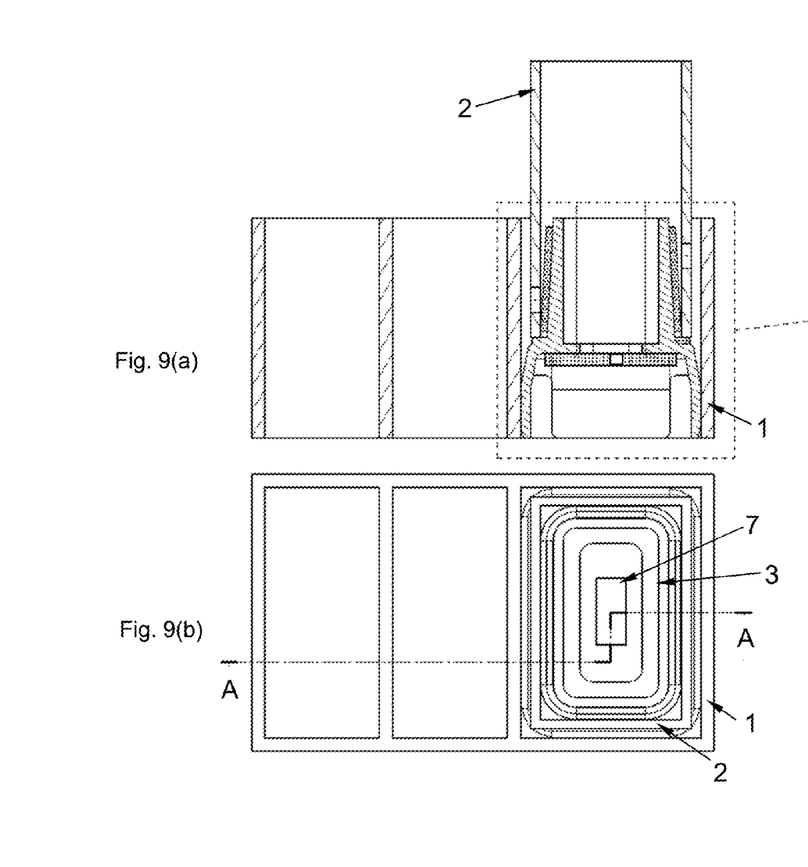
FIGS. 9(a) and 9(b) illustrate a side, sectional view of an adhesive joint corresponding to the section A-A and a plan view, in accordance with embodiments.
Figure 10:
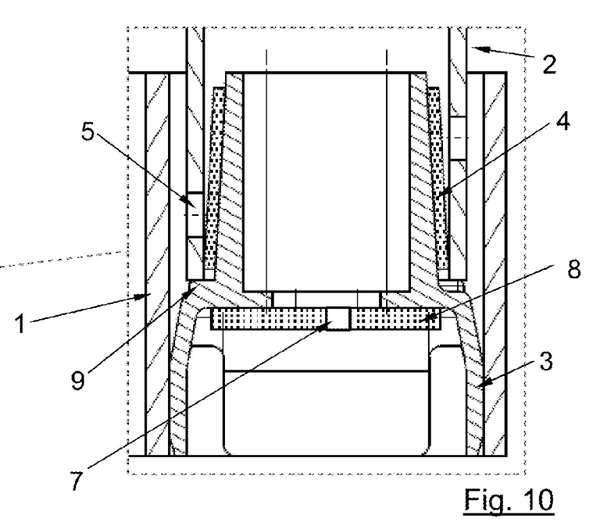
FIG. 10 illustrates a side view of the adhesive joint of FIG. 9(a).
Figure 11:
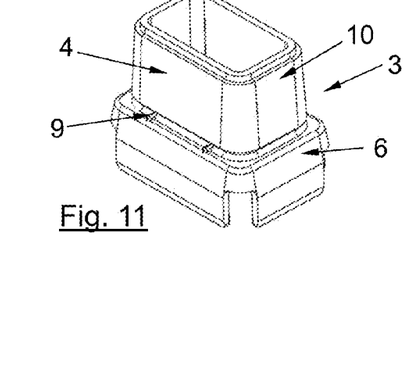
FIG. 11 illustrates a perspective view of a core, in accordance with embodiments.

As illustrated in FIGS. 9 to 11, an adhesive joint in accordance with embodiments is provided in which the first hollow profile 1 is part of an all-encompassing component which forms a plurality of channels. The core 3 and/or the base surface 6 thereof have projections which extend downwardly and which bear against the inner faces of the first hollow profile 1. The core 3, when the structural adhesive 4 has been applied, is illustrated three-dimensionally in FIG. 11.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS

1 First hollow profile
2 Second hollow profile
3 Core
4 Structural adhesive
5 Bore
6 Base body
7 Through-hole
8 Expanding foam
9 Spacer lug
10 Neck

What is claimed is:

1. An adhesive joint, comprising:
a first hollow profile;
a second hollow profile surrounded in an overlapping region by the first hollow profile, the second hollow profile having bores at the overlapping region;
a core insert connected to the first hollow profile, and arranged in the overlapping region inside the first hollow profile and the second hollow profile; and
an expandable structural adhesive moveable from a non-expanded state in which the expandable structural adhesive is arranged at an outer face of the core insert, to an expanded state in which the expandable structural adhesive is to pass through the bores, contact an inner face of the first hollow profile, and thereby connect the core insert, the first hollow profile and the second hollow profile to each other.

2. The adhesive joint of claim 1, wherein the core insert has a base body with a diameter that corresponds to an internal diameter of the first hollow profile.

3. The adhesive joint of claim 2, wherein the base body has a through-hole to permit a drainage of liquids.

4. The adhesive joint of claim 3, further comprising an expandable foam arranged on the base body, and which seals the through-hole in the base body.

5. The adhesive joint of claim 2, wherein the base body has spacer lugs which permit a predetermined vertical spacing between the second hollow profile and the base body.

6. The adhesive joint of claim 1, wherein the core insert has a neck with a diameter that is less than an internal diameter of the second hollow profile.

7. The adhesive joint of claim 6, wherein the neck extends parallel to the inner faces of the second hollow profile or tapers in a conical manner.

8. The adhesive joint of claim 6, wherein the first hollow profile, the second hollow profile, and the neck of the core insert have a same cross-sectional profile.

9. A method to produce an adhesive joint between a first hollow profile and a second hollow profile, the method comprising:
applying an expandable structural adhesive to an outer face of a core insert;
arranging the core insert in the first hollow profile to at least temporarily connect the core insert in the first hollow profile;
arranging the second hollow profile in a free channel spatially between the core insert and the first hollow profile; and
expanding the expandable structural adhesive from a non-expanded state on the core insert, to an expanded state in which the expandable structural adhesive is to pass through bores in the second hollow profile, contact an inner face of the first hollow profile, and thereby connect the core insert, the first hollow profile, and the second hollow profile to each other.

10. The method of claim 9, wherein the expandable structural adhesive is expanded via a thermal process.

11. The method of claim 9, wherein the expandable structural adhesive is expanded via a chemical reaction.

12. The method of claim 9, further comprising, after arranging the core insert in the first hollow profile, and before expansion of the expanding structural adhesive, conducting a cathodic dip coating process on the core insert, the first hollow profile, and the second hollow profile.

13. The method of claim 9, wherein the core insert has a base body with a diameter that corresponds to an internal diameter of the first hollow profile.

14. The method of claim 13, further comprising, applying an expandable foam to the base body, and then expanding the expandable foam, after arranging the core insert in the first hollow profile.

15. The method of claim 13, further comprising, applying an expandable foam to the base body, and then expanding the expandable foam, after arranging the core insert in the first hollow profile.

16. A joint, comprising:
a first hollow profile;
a second hollow profile configured for insertion in the first hollow profile to define an overlapping region and a first space between the first hollow profile and the second hollow profile, the second hollow profile having bores at the overlapping region;
a core insert arranged in the second hollow profile too define a second space between the core insert and the second hollow profile; and
an adhesive, configured for application to an outer face of the core insert, and which is moveable from a non-expanded state at the core insert, to an expanded state to pass through the bores, fill the first space and the second space, contact an inner face of the first hollow profile, and thereby connect the core insert, the first hollow profile, and the second hollow profile to each other.

17. The adhesive joint of claim 16, wherein the core insert has a base body with a diameter that corresponds to an internal diameter of the first hollow profile.

18. The joint of claim 16, further comprising an expandable foam, which is expandable from a non-expanded state on the base body, to an expanded state to extend through a central opening of the base body, on an upper face of the base body, and the inner face of the first hollow profile.

* * * * *